US006586481B2

(12) United States Patent
Pederzani et al.

(10) Patent No.: US 6,586,481 B2
(45) Date of Patent: Jul. 1, 2003

(54) CATALYST BASED ON COBALT AND ITS USE IN THE FISCHER-TROPSCH PROCESS

(75) Inventors: Giovanni Pederzani, San Donato Milanese (IT); Roberto Zennaro, Venezia (IT); Sonia Morselli, Reggiolo (IT); Gastone Del Piero, Milan (IT)

(73) Assignees: ENI S.p.A., Rome (IT); AGIP Petroli S.p.A., Rome (IT); Institut Francais du Petrole, Rueil Malmaison (FR); Enitecnologie S.p.A., San Donato Milanese (IT)

( * ) Notice: Subject to any disclaimer, the term of this patent is extended or adjusted under 35 U.S.C. 154(b) by 0 days.

(21) Appl. No.: 10/086,896

(22) Filed: Mar. 4, 2002

(65) Prior Publication Data

US 2002/0183405 A1 Dec. 5, 2002

(30) Foreign Application Priority Data

Mar. 8, 2001 (IT) ..................... MI2001A0478

(51) Int. Cl.[7] .......... C07C 27/00; C07C 27/06; B01J 23/40; B01J 23/42; B01J 23/56
(52) U.S. Cl. .......... 518/715; 502/327; 502/332; 502/355; 502/415; 502/439
(58) Field of Search ........... 502/327, 332, 502/355, 415, 439; 518/715

(56) References Cited

U.S. PATENT DOCUMENTS

| 3,894,963 | A | * | 7/1975 | Gerdes et al. | 252/464 |
|---|---|---|---|---|---|
| 4,207,248 | A | * | 6/1980 | Butter et al. | 260/449.6 R |
| 4,280,930 | A | * | 7/1981 | Antos | 252/466 B |
| 4,440,874 | A | * | 4/1984 | Thompson | 502/327 |
| 4,469,812 | A | * | 9/1984 | Sorrentino et al. | 502/230 |
| 4,622,308 | A | * | 11/1986 | Koikeda et al. | 502/66 |
| 4,659,743 | A | * | 4/1987 | Rao et al. | 518/715 |
| 4,717,702 | A | * | 1/1988 | Beuther et al. | 502/303 |
| 4,904,633 | A | * | 2/1990 | Ohata et al. | 502/304 |
| 5,767,040 | A | * | 6/1998 | Bhattacharyya et al. | 502/524 |
| 5,780,381 | A | * | 7/1998 | Wilson et al. | 502/308 |
| 6,121,333 | A | * | 9/2000 | Clerici et al. | 518/715 |
| 6,218,335 | B1 | * | 4/2001 | Okada et al. | 502/340 |
| 6,262,132 | B1 | * | 7/2001 | Singleton et al. | 518/715 |
| 6,306,795 | B1 | * | 10/2001 | Ryan et al. | 502/346 |
| 6,331,574 | B1 | * | 12/2001 | Lapidus et al. | 518/709 |

FOREIGN PATENT DOCUMENTS

| DE | 25 24 636 | 12/1975 |
|---|---|---|
| EP | 0 979 807 | 2/2000 |
| EP | 1 031 378 A2 | 8/2000 |

* cited by examiner

Primary Examiner—Stanley S. Silverman
Assistant Examiner—Cam N. Nguyen
(74) Attorney, Agent, or Firm—Oblon, Spivak, McClelland, Maier & Neustadt, P.C.

(57) ABSTRACT

A catalyst, which can be used in the Fischer-Tropsch process, and contains cobalt oxide having crystals with an average size ranging from 20 to 80 Å supported on an inert carrier of alumina. A preparation process for the catalyst and a Fischer-Tropsch process utilizing the catalyst are also provided.

16 Claims, No Drawings

CATALYST BASED ON COBALT AND ITS USE IN THE FISCHER-TROPSCH PROCESS

The present invention relates to a catalyst based on cobalt, its preparation and its use in the Fischer-Tropsch process.

The Fischer-Tropsch process is a process well-known to experts in the field, which essentially consists in the hydrogenation of CO to give hydrocarbons. The reaction conditions are also described in literature.

Catalysts which can be used in the Fischer-Tropsch process generally consist of metals of group VIII supported on a carrier, preferably selected from alumina, silica, titania and relative mixtures.

All research projects on the Fischer-Tropsch process are being increasingly orientated towards a greater selectivity to $C_{9+}$, particularly $C_{22+}$ hydrocarbons, the latter also known as Fischer-Tropsch waxes.

Among these Fischer-Tropsch catalysts, Cobalt, which is particularly effective in directing the reaction towards the formation of waxes, is becoming more and more widely used.

A particular catalyst based on cobalt supported on alumina has now been found, which is more selective, with respect to normal cobalt catalysts, towards the formation of waxes in the Fischer-Tropsch process.

In accordance with this, the present invention relates to a catalyst which can be used in the Fischer-Tropsch process, essentially consisting of cobalt oxide supported on an inert carrier essentially consisting of alumina, characterized in that the above cobalt oxide essentially consists of crystals having an average size ranging from 20 to 80 Å, preferably from 25 to 60 Å, even more preferably from 30 to 40 Å.

The above crystals of cobalt oxide can be optionally partly doped with Al atoms.

With respect to catalysts known in the art, the catalyst of the present invention has the characteristic of consisting of crystals with much lower dimensions, 20–80 Å for the catalyst of the present invention against the 120–180 Å of a catalyst prepared according to the conventional techniques. This allows a better dispersion of the cobalt on the carrier, with a consequent better contact, in reaction phase, between the catalyst and reagents.

In addition to cobalt oxide, the catalyst of the present invention may optionally also contain, in a much lower quantity than the cobalt, metals normally known as promoters, such as Si, Zr, Ta, Zn, Sn, Mn, Ba, Ca, La, Ve, W. Promoters are used for improving the structural stability of the carrier itself.

One or more activity promoters with a different effect on the catalytic performances as described in the art (see for example B. Jager, R. Espinoza in "Catalysis Today", 23, 1995, 21–22), can also be optionally present together with the cobalt. For example, promoters such as K, Na, Mg, Sr, Cu, Mo, Ta, W and metals of group VIII essentially increase the activity. Ru, Zr, rare-earth oxides (REO), Ti increase the selectivity to high molecular weight hydrocarbons. Ru, REO, Re, Hf, Ce, U, Th favour the regenerability of cobalt catalysts.

As far as the alumina is concerned, this can have any phase form selected from eta, gamma, delta, theta, alpha and relative mixtures, in the presence of or without one or more structural stability promoters selected from those described above. In the preferred embodiment, the alumina is in γ or δ form, and relative mixtures.

The surface area of the alumina is that which is normal in catalytic carriers, i.e. from 20 to 300 $m^2/g$, preferably from 50 to 200 $m^2/g$ (BET), whereas the average dimensions of the alumina itself range from 1 to 300 $\mu$m.

The cobalt content of the catalyst of the present invention ranges from 2 to 50% by weight, preferably from 5 to 20% by weight, 100 being the total weight of the carrier and cobalt (plus possible promoters). When present, the promoters are in a quantity not higher than 20% by weight with respect to the cobalt, preferably 10% by weight.

Before being used in the Fischer-Tropsch process, the catalyst of the present invention should be activated by means of the usual procedures, for example by reduction of cobalt oxide to metallic cobalt in the presence of hydrogen.

In accordance with this, the present invention relates to a process for obtaining cobalt oxide supported on an inert carrier essentially consisting of alumina, the above cobalt oxide essentially consisting of crystals having an average size ranging from 20 to 80 Å, which comprises the following steps:

1) preparation of an intermediate, supported on alumina, having general formula (I)

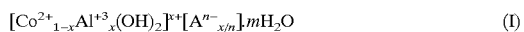

wherein x ranges from 0.2 to 0.4, preferably from 0.25 to 0.35, A is an anion, x/n is the number of anions necessary for neutralizing the positive charge, m ranges from 0 to 6, and is preferably 4;

2) calcination of the intermediate having general formula (I) with the formation of crystalline cobalt oxide.

With respect to the anion $A^{n-}$, this can be indifferently selected from inorganic anions (for example $F^-$, $Cl^-$, $Br^-$, $I^-$, $ClO_4^-$, $NO_3^-$, $OH^-$, $IO_3^-$, $CO_3^{2-}$, $SO_4^{2-}$, $WO_4^{2-}$), heteropolyacids (for example $PMo_{12}O_{40}^{3-}$, $PW_{12}O_{40}^{3-}$) organic acids (for example adipic, oxalic, succinic, malonic acid). In the preferred embodiment the anion $A^{n-}$ is chosen from $NO_3^-$, $OH^-$, $CO_3^{2-}$. In an even more preferred embodiment $A^{n-}$ is equal to $CO_3^{--}$.

The compound having general formula (I) can be prepared according to various techniques known to experts in the field.

For example, the so-called precipitation technique can be used, according to which $Co^{2+}$ and $Al^{3+}$ are co-precipitated on alumina in the form of hydroxides. According to this technique, a solution of an Aluminum salt and a Cobalt salt, preferably an aqueous solution of the above salts, is dripped onto a suspension, preferably aqueous, of alumina. This operation must be effected maintaining the pH within a range of 6.6 to 7.2, preferably from 6.8 to 7.1, for example by the use of an aqueous solution of bicarbonate or soda. Alternatively, two separate solutions can be added; however, for the sake of simplicity, it is obviously preferable to use a single solution of the two salts. The compound having general formula (I) is recovered by means of filtration.

According to another less preferred embodiment, the so-called hydro-thermal technique can be used, which consists in treating freshly precipitated mixed cobalt and aluminum hydroxides, or mechanical mixtures of the oxides, with water.

The compound having general formula (I) can be amorphous or crystalline. The ratio between the amorphous part and the crystalline part can be modified using known techniques (for example by annealing). The crystalline part of the compound having general formula (I) has a structure similar to that of hydrotalcite.

Hydrotalcite is a mineral existing in nature and consists of an Al and Mg hydroxy-carbonate. A hydrotalcite-type system has an analogous structure, but contains different elements.

The group of hydrotalcites can be represented by the following formula:

$$[M^{2+}_{1-x}M^{+3}_x(OH)_2]^{x+}[A^{n-}_{x/n}] \cdot mH_2O$$

in the case of actual hydrotalcite $M^{2+}=Mg^{2+}$, $M^{3+}=Al^{3+}$ and $A^{n-}=CO_3^{2-}$.

One of the main characteristics of this group of compounds is the layered structure: layers of the brucite type, $Mg(OH)_2$, or $[M^{2+}_{1-x}M^{+3}_x(OH)_2]^{x+}$, in which a part of the bivalent $M^{2+}$ ions is substituted by trivalent $M^{3+}$ ions, alternate with anionic layers associated with a varying content of water $(A^{n-}_{x/n}) \cdot mH_2O$. The anionic layers balance the positive charge of the hydroxide layers, the latter linked to the presence of trivalent ions.

In general, $M^{2+}$ and $M^{3+}$ can be ions of a varying nature, the only requisite is that they are able to insert themselves in the cavities left by the hydroxyls in a compact configuration of the brucite type (more simply, they must have an ionic radius similar to that of $Mg^{2+}$). The value of x in the structural formula ranges from 0.2 to 0.4, preferably from 0.25 to 0.35. Outside this range pure hydroxides or other compounds with a different structure can be obtained. Formulations of the hydrotalcite type have the following ratios $M^{2+}/M^{3+}=2$ and $M^{2+}/M^{3+}=3$, as limits in the composition, which do not imply differences in the lattice and structural parameters (only the internal distribution of the cations in the brucite layer changes). More information on compounds of the hydrotalcite type are contained in the review "Hydrotalcite-type anionic clays: preparation, properties and applications" (Catalysis Today, 11(1991) 173–301).

Once the compound having general formula (I) has been prepared and isolated, before beginning step (2), it is preferable to subject the compound itself to a drying step in order to reduce the quantity of water (or solvent) pg,9 adsorbed.

Step (2) consists in the calcination of the compound having general formula (I) at a temperature ranging from 300 to 500° C., preferably from 350 to 450° C.

As already mentioned, before being used in the Fischer-Tropsch process, the catalyst is subjected to reduction. This operation is carried out, in the preferred embodiment, by means of treatment with hydrogen, optionally diluted with inert gases, for example nitrogen. The reduction step is preferably effected at a temperature ranging from 300° C. to 500° C., even more preferably from 320° C. to 450° C. It is possible to operate either under pressure or at atmospheric pressure, the latter condition being preferred. The duration of the reduction process varies in relation to the experimental conditions (temperature, pressure, dilution or non-dilution of the hydrogen).

A further object of the present invention relates to a process for the preparation of prevalently $C_{22+}$ hydrocarbons, or so-called Fischer-Tropsch waxes, characterized in that it is carried out in the presence of the catalyst according to claim 1.

The Fischer-Tropsch process is the well-known reaction between CO and $H_2$, optionally diluted with $CO_2$ and/or $N_2$, to give prevalently $C_{22+}$ hydrocarbons.

The reaction conditions are described in literature. For example, the temperatures can range from 170° C. to 400° C., preferably from 180° C. to 250° C., whereas the pressures can vary from 1 to 100 bars, preferably from 15 to 40 bars. The $CO/H_2$ ratio can vary from 0.5/1 to 4/1, preferably from 1.87/1 to 2.5/1, the stoichiometric value (more or less 3%) being preferred.

The catalyst of the present invention can be used either in a fixed bed reactor or in a slurry-type reactor.

The following examples are provided for a better understanding of the present invention.

EXAMPLES

The examples considered refer to two catalysts based on cobalt called A (comparative catalyst) and B. For both the carrier is γ-δ alumina Condea Scca 5-170. The morphological characteristics of the carrier are indicated below:

TABLE 1

| Alumina carrier ($Al_2O_3$) | |
| --- | --- |
| Crystalline phase | 60% γ – 40% δ |
| Surface area ($m^2/g$) | 162 |
| Pore specific volume ($cm^3/g$) | 0.46 |
| Particle-size distribution | 50% < 82 Å($d_p$) |

Preparation of Comparative Catalyst A

Catalyst A is prepared by means of the incipient wetness technique.

100 g of γ-δ alumina Condea Scca 5-170 are impregnated with 100 cc of an aqueous solution of $Co(NO_3)_2 \cdot 6H_2O$ (0.3 moles). The impregnated carrier is left to dry in an oven at 80° C. for 16 h, and is then subjected to calcination in muffle in a stream of air according to the following thermal profile:

from 25 to 350° C. (10° C./min)

isotherm at 350° C. (30 min)

from 350 to 400° C. (5° C./min)

isotherm 400° C. (240 min)

from 400 to 25° C. (10° C./min).

The dried catalyst is characterized by means of XRD analysis.

The calcined catalyst is characterized by means of elemental analysis, XRD analysis and XPS analysis.

Characterization of the Dried Sample A

The dried sample A is subjected to XRD analysis. The spectrum reveals the presence of large crystals of hexavalent cobalt nitrate used during the impregnation phase as cobalt precursor, as well as the γ,δ phase of the Condea Scca 5-170 alumina carrier.

Characterization of the Calcined Sample A

The calcined catalyst A is subjected to elemental analysis in order to determine the actual cobalt content introduced with the preparation. The cobalt content determined corresponds exactly to 14.2% by weight.

The sample is also subjected to XRD analysis and the spectrum reveals the presence, in addition to the γ-δ phase of the carrier, of a spinel phase which can be attributed to the species $Co(Co_{2-x}Al_x)O_4$.

The Al % contained is defined on the basis of a structural refinement of the spectrum. This value refers to the % of cationic sites of the pure spinel phase of Cobalt oxide ($Co_3O_4$) occupied by aluminum ions and indicates interactions between oxide precursor and carrier. Table 2 specifies the data obtained from the XRD spectrum relating to weight % of the spinel phase, % of Al ions present in the spinel phase, and dimensions of the crystallites. The latter was determined using the Scherrer method.

TABLE 2

XRD analysis of catalyst A

| Spinel phase % | Al ion % | Crystal size (Å) |
|---|---|---|
| 20.3 | 7.2 | 135 |

The calcined catalyst A is finally subjected to XPS analysis. This spectroscopic technique can provide information as to the composition and morphology of the system, with respect to the surface layers of the sample.

Table 3 indicates the results of the analysis:

TABLE 3

XPS analysis of catalyst A

| B.E. Co 2p½ (eV) | ΔE Co(2p½ – 2p½)(eV) | Co 2p/Al 2s |
|---|---|---|
| 780 | 15.1 | 0.15 |

B.E. = binding energy

The first two columns of Table 3 identify the presence of $Co_3O_4$ on the surface of the catalyst whose composition is well defined by XRD analysis; the third column refers to the ratio between the intensity of the XPS signal relating to cobalt 2p and the intensity of the signal relating to aluminum 2s of the carrier and gives important indications regarding the distribution of the cobalt precursor with respect to the carrier. The higher the value of this ratio, the more uniformly distributed the phase containing cobalt will be on the surface of the carrier. In the case of catalyst A the ratio is equal to 0.15, which means that the cobalt oxide is not uniformly distributed on the surface of the carrier, but rather can induce the assumption of the presence of islands of cobalt oxide distributed at random on the surface. This is a characteristic common to alumina supported systems prepared according to the traditional techniques, often confirmed by SEM images.

The cobalt reduction percentage, determined analytically on the sample reduced at 400° C. for 16 h in a stream of pure $H_2$, corresponds to 35%.

Preparation of Catalyst B

Unlike catalyst A, catalyst B of the present invention is prepared according to the synthesis method which produces the compound having general formula (I), having a hydrotalcite-type structure, and its subsequent calcination.

Two aqueous solutions are prepared: one of $Co(NO_3)_2.6H_2O$ and $Al(NO_3)_3.9H_2O$ (molar ratio Co/Al 3:1) having a concentration equal to 1 Mol ($M^{n+}$)/liter and one of $NaHCO_3$ having a concentration equal to 1.3 Moles/liter.

The two solutions are slowly and contemporaneously dripped at room temperature into a single container, into which the γ-δ alumina Condea Scca 5-170 carrier has been dispersed (55 g in about 200 ml of distilled water). The objective is to obtain, after calcination, a cobalt content ranging from 13 to 15% by weight. During the addition of the two solutions, the pH, controlled by means of a glass electrode, remains constant, between 6.8 and 7.1.

The solid is recovered by filtration on a büchner and repeatedly and abundantly washed with distilled water; it is then left to dry in an oven at 80° C. for 16 hours. Calcination is subsequently effected in muffle in a stream of air.

The calcination treatment is carried out under the following conditions:

from 25 to 350° C. (10° C./min)
isotherm at 350° C. (30 min)
from 350 to 400° C. (5° C./min)
isotherm 400° C. (240 min)
from 400 to 25° C. (10° C./min).

Analogously to example A, the dried catalyst B is characterized by means of XRD analysis and the calcined catalyst B is characterized by means of elemental analysis, XRD analysis and XPS analysis.

Characterization of the Dried Catalyst B

After drying, catalyst B is subjected to XRD analysis. The spectrum reveals the presence of a hydrotalcite-type crystalline phase, well formed in spite of the relatively low crystal size. This phase can be represented by the formula:

$$[Co^{2+}{}_6Al^{3+}{}_2(OH)_{16}]^{2+}[CO_3{}^{2-}].4H_2O$$

The results of the XRD characterization are indicated in Table 4.

The quantity of hydrotalcite phase calculated corresponds to a lower cobalt content than the total quantity determined via elemental analysis, and it should therefore be assumed that the missing part is otherwise located in the aluminum carrier, forming an undetectable fraction, well dispersed in the carrier.

It cannot be excluded that there is still a hydrotalcite phase present in the form of crystallites of such small dimensions as to be invisible to XRD analysis.

In any case it should be noted that the presence of cobalt nitrate hexahydrate is not observed, contrary to what is confirmed in the dried reference catalyst.

Characterization of the Calcined Catalyst B

The calcined catalyst B is subjected to elemental analysis in order to determine the actual content of cobalt introduced with the preparation. The cobalt content determined exactly corresponds to 14.7% by weight.

The sample is also subjected to XRD analysis and the spectrum reveals the presence of two spinel phases, one is γ-$Al_2O_3$ deriving from the carrier, the other is a mixed Co/Al/O oxide. The results are indicated in Table 4 below.

TABLE 4

XRD analysis of catalyst B

| B | Phase | a (Å) | V (Å³) | Crystal size (Å) |
|---|---|---|---|---|
| Dried | Hydrotalcite | 3.074 | 188.3 | 65 |
| Calcined | Co/Al/O | 8.086 | 528.7 | 45 |

Unlike the dried sample, the quantity of mixed oxide is congruent with the probable cobalt content.

The two phases have cell parameters extremely close to those of the respective references (Table 5).

TABLE 5

Comparison of the cell parameters with literature data.

| | a (Å) | V (Å$^3$) |
|---|---|---|
| Co$_3$O$_4$ lit. ref. | 8.084 | 528.3 |
| γ-Al$_2$O$_3$ lit. ref. | 7.924 | 497.5 |
| Co$_2$AlO$_4$ lit. ref. | 8.086 | 528.7 |
| Phase γ-Al$_2$O$_3$ cat. B | 7.920 | 496.8 |
| Phase Co/Al/O cat. B | 8.086 | 528.7 |

Calculation on the basis of three possible formulae leads to the results indicated in Table 6.

TABLE 6

| Hypothetical phase type | Calculated Co % |
|---|---|
| Co$_3$O$_4$ | 17.6 |
| Co$_2$AlO$_4$ | 13.5 |
| CoAl$_2$O$_4$ | 8 |

The most probable formulation, also on the basis of the elemental datum, is Co$_2$AlO$_4$, perhaps a little more enriched with cobalt, better represented by the formula Co$_{2+x}$Al$_{1-x}$O$_4$.

It can be concluded that with calcination, the cobalt dispersed in the carrier, not visible to XRD, contributes, together with the visible hydrotalcite, to the formation of the mixed Co/Al/O oxide.

The size of the crystallites of the Co/Al/O spinel phase present in catalyst B is considerably lower than that registered in catalyst A for the Co(Co$_{(2-x)}$, Al$_x$)O$_4$ spinel.

Catalyst B, after calcination, is subjected to XPS analysis analogously to the procedure for catalyst A. The relative results are indicated in Table 7:

TABLE 7

XPS analysis of catalyst B

| B.E. Co 2p½ (eV) | ΔE Co(2p½ – 2p½) (eV) | Co 2p/Al 2s |
|---|---|---|
| 781 | 15.2 | 1.73 |

B.E. = binding energy

As for catalyst A, the first two columns indicate the presence of the compound Co$_3$O$_4$ on the surface of the carrier; the B.E. value however referring to Co 2p equal to 781 eV is much higher than that observed for catalyst A, which can be explained by the presence of an "aluminated" compound (confirmed and better described as a mixed Co/Al/O system by XRD analysis). The most interesting aspect is linked to the Co2p/Al2s ratio (third column) which is unusually high, 10 time higher than that registered for catalyst A. Such a high value can only be explained by a homogeneous distribution of the cobalt precursor on the surface of the carrier. The precursor covers the carrier hiding the XPS signal.

The cobalt reduction percentage, analytically determined on the sample reduced at 400° C. for 16 h in a stream of pure H$_2$, corresponds to 40%.

Description of the Catalytic Tests

Catalysts A and B were used in a reactivity test in an FTR reactor fed in continuous with a mixture of CO and H$_2$ under the conditions indicated in Table 8 below.

TABLE 8

Operating conditions of the catalytic tests

| Reaction temperature: | 200–240° C. |
|---|---|
| Total pressure: | 21 abs. bars |
| H$_2$/CO ratio: | 2/1 |
| Space velocity: | 1.3–3.0 Nl/cc$_{cat}$/h |

The catalyst is charged, in the pre-established quantities, into the fixed bed tubular reactor. The activation of the catalyst is carried out in situ by means of hydrogen reduction (2 Nl/h/1cat) and nitrogen (1Nl/h/1cat) at a temperature ranging from 320–450° C. and a pressure of 1 bar for 16 hours. At the end the reactor is cooled in a stream of nitrogen.

During this phase the system is brought to the final operating pressure of 22 abs. bars. The reagent mixture, consisting of H$_2$ and Co in a stoichiometric ratio of 2:1, is introduced by the progressive feeding of CO—H$_2$ and reduction of the feeding of N$_2$ as indicated in Table 9.

TABLE 9

Feeding conditions in activation phase

| Time range (hours) | CO flow rate (Nl/h) | H$_2$ flow rate (Nl/h) | N$_2$ flow rate (Nl/h) |
|---|---|---|---|
| 0–0.5 | 10 | 20 | 200 |
| 0–0.5 | 10 | 20 | 150 |
| 0–0.5 | 10 | 20 | 100 |
| 0–0.5 | 10 | 20 | 50 |
| 0–0.5 | 10 | 20 | 0 |

At the end of the activation phase, the system proves to be totally without gaseous diluent (nitrogen) and under the conditions of pressure, space velocity, H$_2$/CO ratio indicated in the table. The temperature is subsequently raised to the reaction temperature in about 15 hours. The waxes produced are collected in suitable containers at a temperature of 110° C. The effluent gas from the reactor passes through a meter and a subsequent sampling system for gas-chromatographic analysis. The solid and liquid effluents are analyzed with appropriate gas-chromatographic equipment for the total quantification. In order to normalize the catalytic activity data of the various tests, with respect to the actual cobalt content, the yield to products containing carbon (hydrocarbons and CO$_2$) normalized for the actual moles of cobalt present in the catalyst and for the time units: defined as Co-TY (Cobalt-Time Yield)=moles of converted CO/moles of total Co/hour, is used as a comparative parameter.

Example 1

Comparative Catalyst A

The catalytic activity tests are indicated in Table 10.

TABLE 10

Performances of catalyst A

| Catalyst amount (cc) | 20 | |
|---|---|---|
| T.O.S. (h) | 396 | 730 |
| GHSV (Nl/I$_{cat}$/h) | 1500 | 1500 |
| Temperature (° C.) | 206 | 215 |
| Test pressure (abs. bar) | 21 | 21 |

TABLE 10-continued

Performances of catalyst A

| | | |
|---|---|---|
| actual $H_2$/CO | 2.01 | 2.01 |
| Co % conversion | 33.3 | 51.8 |
| Co-TY (mol conv. CO/h/mol Co) | 4.1 | 6.5 |
| $C_{2+}$ productivity ($C_{2+}$/h/$Kg_{cat}$) | 109.8 | 168.2 |
| $C_{9+}$ productivity ($C_{9+}$/h/$Kg_{cat}$) | 41.7 | 119.5 |
| $C_{22+}$ productivity ($C_{22+}$/h/$Kg_{cat}$) | 23.3 | 53.1 |

Example 2

Catalyst B

The data of the catalytic activity test are indicated in the following table and compared, with iso-conversion, with the data relating to example 1 to evaluate the positive effect, in terms of productivity to higher hydrocarbons ($C_{22+}$), of the catalyst of the present invention.

TABLE 11

Performances of catalyst B

| Catalyst amount (cc) | 20 | |
|---|---|---|
| T.O.S. (h) | 139 | 187 |
| GHSV (Nl/$I_{cat}$/h) | 1500 | 1500 |
| Temperature (° C.) | 225 | 235 |
| Test pressure (abs. bar) | 21 | 21 |
| actual $H_2$/CO | 2.08 | 2.08 |
| Co % conversion | 33.3 | 46.6 |
| Co-TY (mol conv. CO/h/mol Co) | 4.2 | 5.8 |
| $C_{2+}$ productivity ($C_{2+}$/h/$Kg_{cat}$) | 123.3 | 179.7 |
| $C_{9+}$ productivity ($C_{9+}$/h/$Kg_{cat}$) | 96.0 | 136.3 |
| $C_{22+}$ productivity ($C_{22+}$/h/$Kg_{cat}$) | 50.2 | 66.2 |

Specific Activity

Table 12 indicates the specific activity values of the two catalysts in terms of TOF (turnover frequency), or converted CO moles per active site in the time unit.

TABLE 12

Specific activity

| catalyst | T (° C.) | TOF × $10^2$ $s^{-1}$ |
|---|---|---|
| A | 222 | 4.0 |
| B | 219 | 5.8 |

Catalytic Performances

Comment on Tables 10, 11, 12

The use of the catalyst based on cobalt supported on alumina of the present invention allows higher catalytic performances to be obtained, in terms of selectivity to heavy products, than those obtained with a catalyst obtained by the deposition of cobalt on the same alumina carrier, according to the traditional incipient wetness technique.

Example 2 shows how catalyst B, prepared according to the method of the present invention, allow higher productivity values, in terms of $C_{9+}$ and $C_{22+}$, to be obtained (Table 11) with respect to those obtained with comparative catalyst A (Example 1, Table 10).

The comparison between the performances of catalysts A and B is effected at the same CO conversion level equal to 30 and 50%.

In conclusion, catalyst B of the present invention favours the formation of hydrocarbon products with a higher molecular weight, thus forming an additional advantage for transformation processes of Fischer-Tropsch synthesis products.

In order to evaluate the catalytic activity, the specific reactivity of each case intended as TOF, "turnover frequency", must be considered.

A comparison between the TOF data (Table 12) of homologous catalysts, i.e. A and B (the same carrier), demonstrates how the B system, prepared according to the method of the present invention, has a greater specific activity.

What is claimed is:

1. A catalyst for the Fischer-Tropsch process, consisting essentially of cobalt oxide supported on an inert carrier consisting essentially of alumina, wherein the cobalt oxide consisting essentially of crystals having an average size ranging from 20 to 80 Å.

2. The catalyst according to claim 1, wherein the cobalt oxide crystals have an average size of 25 to 60 Å.

3. The catalyst according to claim 2, wherein the cobalt oxide crystals have an average size of 30 to 40 Å.

4. The catalyst according to claim 1, wherein the alumina is in a form of γ, δ, or a mixture thereof.

5. The catalyst according to claim 1, wherein the cobalt content ranges from 2 to 50% by weight.

6. The catalyst according to claim 5, wherein the cobalt content ranges from 5 to 20% by weight.

7. A process for preparing a catalyst consisting essentially of cobalt oxide supported on alumina, wherein the cobalt oxide consisting essentially of crystals having an average size ranging from 20 to 80 Å, which comprises the following steps:

1) preparing an intermediate, supported on alumina, having general formula (I)

$$[Co^{2+}_{1-x}Al^{+3}_x(OH)_2]^{x+}[A^{n-}_{x/n}]\cdot mH_2O \qquad (I)$$

wherein x ranges from 0.2 to 0.4, A is an anion, x/n is the number of anions necessary for neutralizing the positive charge, m ranges from 0 to 6;

2) calcining the intermediate having general formula (I) with the formation of crystalline cobalt oxide.

8. The process according to claim 7, wherein x ranges from 0.25 to 0.35.

9. The process according to claim 7, wherein m=4.

10. The process according to claim 7, wherein A=$CO_3$.

11. The process according to claim 7, wherein step (2) is preceded by a drying step of the compound having general formula (I).

12. The process according to claim 7, wherein step (1) is effected by dripping a solution of an aluminum salt and a cobalt salt, on a suspension of alumina, at a pH ranging from 6.6 to 7.2 and recovering the compound having general formula (I) supported on alumina thus obtained.

13. The process according to claim 12, wherein the pH ranges from 6.8 to 7.1.

14. The process according to claim 7, wherein said calcining is effected at a temperature ranging from 300 to 500° C.

15. The process according to claim 14, wherein said calcining is effected at a temperature ranging from 320 to 450° C.

16. A process for the production of hydrocarbon waxes according to a Fischer-Tropsch process, wherein said process is performed in the presence of the catalyst according to claim 1.

* * * * *